Nov. 18, 1924. 1,516,145
R. BOSSHARDT
THREAD COUNTER
Filed July 20, 1922
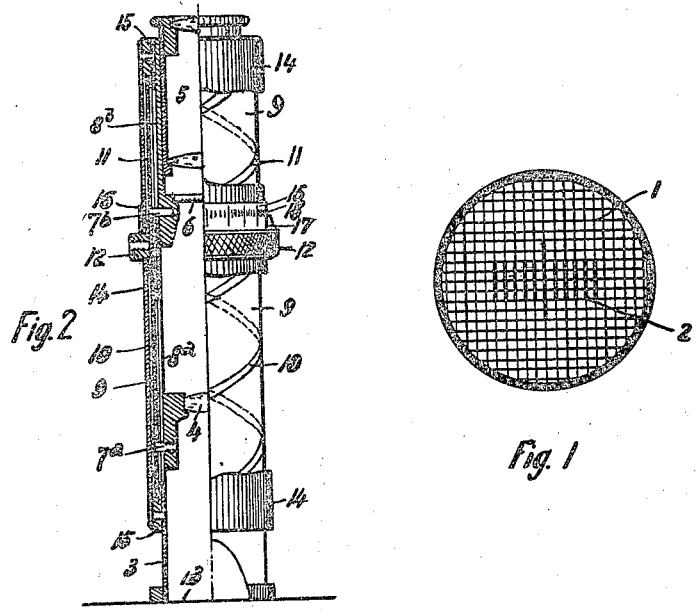
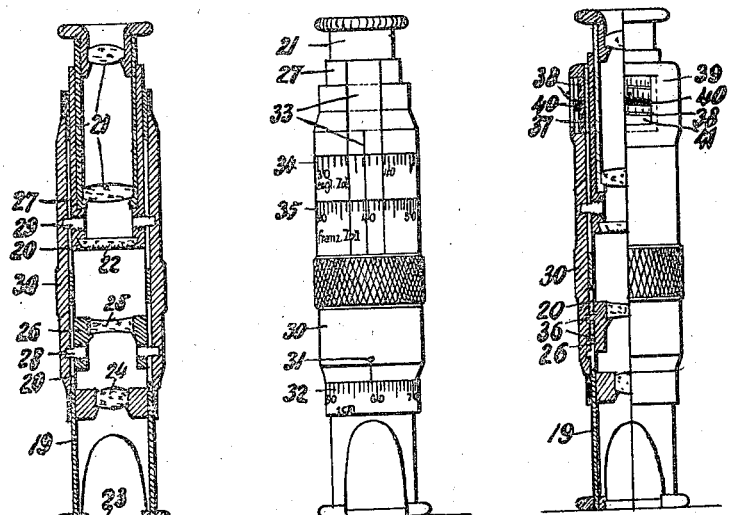
Fig. 3   Fig. 4   Fig. 5
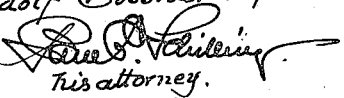
Inventor:—
Rudolf Bosshardt,
by
His attorney.

Patented Nov. 18, 1924.

1,516,145

UNITED STATES PATENT OFFICE.

RUDOLF BOSSHARDT, OF ST. GALLEN, SWITZERLAND.

THREAD COUNTER.

Application filed July 20, 1922. Serial No. 576,244.

*To all whom it may concern:*

Be it known that I, RUDOLF BOSSHARDT, a citizen of the Republic of Switzerland, and resident of St. Gallen, in the Canton of St. Gallen, Switzerland, have invented certain new and useful Improvements in Thread Counters, of which the following is a specification.

The instruments usually used to determine the number of the threads of a fabric consist in the main of a magnifying-glass which is mounted over a generally squarely recessed metal plate in such a manner, that by means of the magnifying-glass the threads within the recess may be easily counted. The said recess as a rule is of the size of one square inch or a fraction thereof, the number of threads therefore being relative to such measuring-units.

If the number of threads for a certain measuring-unit is to be determined without the necessity of any counting operation, series of parallelly arranged lines may be drawn or marked upon, for instance, a transparent plate, in such a way, that the distance of the lines from series to series increases and is equal to the measuring-unit divided by the total number of threads in question. Assuming the measuring-unit to be one inch and the interspace between the lines of any series of lines to amount to $\frac{1}{76}$ inch, each line would, if the said series of lines is brought over a fabric containing 76 threads to the inch, exactly correspond with one of the underlying threads. The number of threads may thus be directly ascertained and read off a scale marked along the series of lines. Should the thread-counter be of the ordinary kind and provided with a simple magnifying-glass, the proportion between the thickness of the thread and the interspace of the threads is equal to 1. A thread-counter of this kind is shown and described in the U. S. A. Patent No. 1,145,959. The instrument according to the latter has the drawback, that for each number of threads one series of lines must be provided.

The present invention on the contrary has the advantage that only a single line of lines is required, which is marked on the common picture field or surface of a compound microscope, the latter being fitted with means by the aid of which the image-producing apparatus or parts thereof are adapted to be adjusted together, though in a different measure. Provision is moreover made on that part of the compound microscope which enables the adjustment of the other parts of a visible scale and a pointer. Inasmuch as the series of lines is invariable, it is essential, in order to obtain a certain relativeness between the interspaces of the lines and the number of threads, to take care that the picture of the fabric appearing in the line-marked surface is capable of being varied in relation to its size. For such purpose there are two ways open, namely:

(*a*) The distance of the fabric may be varied, that is, the whole object-glass with fittings are made adjustable; (*b*) upon a fixed interspace between the fabric and the object-glass the focal distance thereof may be varied, that is, only a part of the picture-producing system or apparatus is made adjustable.

In order that the invention may be clearly understood reference is made to the accompanying drawings, in which I have illustrated two desirable forms of construction of the thread-counter. In these drawings:—

Fig. 1 represents the scope of view of the microscope;

Fig. 2 shows an elevation, partly in section, of the thread-counter in its first form and falling under the aforesaid class (*a*);

Fig. 3 shows a sectional elevation,

Fig. 4 an elevation, and

Fig. 5 another elevation, partly in section, of the thread-counter according to the second construction and coming under the above class (*b*).

Referring to Fig. 1, the reference numeral 1 designates the fabric, and 2 the series of parallel lines, in this case eleven, which are made to coincide with the threads to be counted.

Referring to Fig. 2, the object-glass 4 and the eye-lens 5 together with the line-marked plate 6 are mounted within the tubular stand 3 and made slidable therein in the direction of the optical axis. In order to effect such sliding movement the mountings for the object-glass and the lens have fixed therein pins 7ª and 7ᵇ respectively, which are extending through and guided by slots 8ª and 8ᵇ provided, respectively, in the lower and upper portion of the tubular stand 3, the said pins moreover engaging with spiral-shaped grooves in an outer tube 9. The latter has attached to it a ring 12 and is adapted to be rotated about its axis. Consequent upon a rotary movement of the tube 9 the object-glass 4 and the lens 5 are slid in the direction of the optical axis. The gradient of the grooves, which are designated by 10 and 11, must be made such that the adjusting movement which is imparted thereby to the lens 5 and the line-mark plate 6 causes the last named. even with the object-glass 4 in any position, to be in the picture field of said object-glass, so that without special manipulation a sharp and clear picture of the fabric is obtained.

Securely mounted on a cover-tube 14, which by means of rings 15 at the top and bottom is firmly joined to the tubular stand 3, is a sleeve 16 having a graduated scale 18, the latter and a pointer 17 carried by the aforementioned ring 12 serving as an indicating device.

When the distance between the object-glass 4 and the fabric lying at the base 13 of the microscope is varied, the size of the picture-sheet is accordingly varied. The more the object-glass 4 is made to approach the fabric the larger the appearance of the threads and vice versa, while the lines marked on the plate 6 remain ever of the same size. If the object-glass 4, by turning the ring 12, is brought into a position in which the lines on the plate 6 coincide with the threads of the fabric, Fig. 1, the pointer 17 carried by the ring 12 points to a graduation on the scale 18 which corresponds with the number of the threads of the fabric to be examined. Upon bringing into coincidence of the lines with the fabric-threads every thread-number corresponds therefore with a certain position of the pointer or indicator 17 on the scale 18.

According to the other form of construction, Figs. 3 to 5, I provide a tubular stand 19 which, as in the former case, is also formed with slots 20 arranged parallel to the axis of the microscope, the said tubular stand having mounted therein object-glasses 24, 25 and an eye-glass or lens 21 and line-marked plate 22. The object-glasses consist of the positive lens 24 secured at a predetermined distance from the basis 23 of the microscope, and a negative lens adapted to be moved in the direction of the optical axis. Both lenses 24 and 25 project together a true picture in the picture field. Owing to any adjustment of the negative lens 25 the said field also undergoes an adjustment, with the result, that similarly to the construction first described the eye-lens 21 in common with the line-marked plate 22 require adjustment. In order to effect the latter, the fittings 26 and 27 for the object-glasses and the eye-lens are respectively provided with guide pins 28 and 29, which engage in spiral-shaped grooves fashioned in the outer and rotatable tube 30. This tube is bearing on the tubular stand 19, and the gradient of the spirally disposed grooves is calculated such, that upon rotation of the tube 30 the negative lens 25 as well as the eye-lens 21 are moved in such a manner that a sharp and clear picture of any fabric situated at the base 23 is obtained through the eye-lens. This with the negative lens in any desired position.

In consequence of an adjustment of the negative lens 25, that is, owing to the variation of the distance of the two lenses forming the object-glasses, the equivalent focal distance is subjected to a change and as a result, too, the size of the picture of the fabric. It is thus possible, since the series of lines 22 ever appears to the eye of the same size, to cause the threads of the fabric to coincide with the marked lines as and in the manner previously described. Again, by means of the pointer 31 mounted on the tube 30, the number of threads may be directly read off the scale of which the graduations 32 correspond with the number of threads. The pointer 31 could, if desired, be also fixed on the tubular stand 19, and the graduations be marked on the rotatable tube 30.

In view of the difference in measure-units, that is, since English inches, French inches or fractions thereof or metric systems are in use, it is advantageous to make provision, besides the graduation 32, not only other graduations 34, 35 in convenient places on the tube 30, but also corresponding pointers 33 so that the numbers of the threads may at the same time with equal facility and without further adjustments be read off relative to the different measure-units.

It is of further advantage to have the plates 6 or 22 marked with two or more series of lines. They might, for instance, be marked with two similar series placed one above the other, which arrangement would allow of the determination simultaneously or consecutively of the number of threads in the direction of the warp as well as in the direction of the shot without necessitating any displacement of the instrument.

Moreover, it will be easily understood that the instruments described serve not only for the counting of the threads of a fabric but also for the gauging of objects of other though similar nature.

In the two forms of construction hereinbefore set forth it is taken for granted that a single complete rotation of the tube 9 or 30 is sufficient to permit of the counting or determining of all threads entering into the question. To increase the precision of the instrument and more particularly that of the means for the adjustment of the negative lens 25, and the indicator device, the gradient of the spiral-shaped grooves is reduced to such an extent that instead of one rotation of the tube 9 or 30 several rotations are to take place.

For this purpose I form part of the lens-fitting 26, Fig. 5, with screw-threads 36 which engage corresponding screw-threads in the tube 30. According to the increase of the number of rotary movements the graduations of the scales must be extended, a sleeve 37 securely mounted on the tubular stand 19 being provided with a spirally formed groove 38 along the edges of which the graduation 39 is marked. A pointer 40 fixed in a recess of the tube 30 and adapted to turn therewith projects into the groove 38 and is therefore caused to be moved along the groove and the graduation when the tube 30 is rotated. The reading off from the graduation may take place through the medium of a transparent plate 41 attached to the tube 30.

Having now fully described my said invention what I claim and desire to secure by Letters Patent is:—

1. A thread counter comprising a tubular casing, a line-marked member slidably mounted therein, an object glass independently slidable in the casing, and common means for sliding the glass and member.

2. A thread counter comprising a tubular casing, a line-marked member slidably mounted therein, an object glass carrier slidable in the casing, and unitary cam-means for simultaneously adjusting the member and carrier.

3. A thread counter comprising a casing, a guide member within the casing having a slot, a line-marked member slidable in the guide member and having a projection engaging in the slot thereof, and an actuator interposed between the casing and guide member and having a cam part coacting with the projection to adjust the line-marked member.

4. A thread counter comprising a casing, a guide member within the casing having longitudinally spaced slots, a line-marked member, an object glass carrier, both the line-marked member and carrier being slidable in the guide member and each having a projection engaging in the slot thereof, and a sleeve-like actuator interposed between the casing and the guide member and having cam grooves engaging with the aforesaid projections to adjust the line-marked member and the carrier.

RUDOLF BOSSHARDT.